United States Patent
Zhao et al.

(10) Patent No.: US 10,642,096 B2
(45) Date of Patent: May 5, 2020

(54) BACKLIGHT MODULE AND DISPLAY DEVICE

(71) Applicant: BOE Technology Group Co., Ltd., Beijing (CN)

(72) Inventors: Weili Zhao, Beijing (CN); Xue Dong, Beijing (CN); Xiaochuan Chen, Beijing (CN); Wenqing Zhao, Beijing (CN); Zhongxiao Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/422,069

(22) Filed: May 24, 2019

(65) Prior Publication Data

US 2020/0057337 A1 Feb. 20, 2020

(30) Foreign Application Priority Data

Aug. 15, 2018 (CN) .......................... 2018 1 0929386

(51) Int. Cl.
| | |
|---|---|
| *G02F 1/1335* | (2006.01) |
| *F21V 8/00* | (2006.01) |
| *G02B 5/18* | (2006.01) |
| *G02F 1/13357* | (2006.01) |

(52) U.S. Cl.
CPC ..... *G02F 1/133602* (2013.01); *G02B 5/1814* (2013.01); *G02B 5/1819* (2013.01); *G02B 6/005* (2013.01); *G02B 6/0035* (2013.01); *G02F 2201/30* (2013.01); *G02F 2201/305* (2013.01)

(58) Field of Classification Search
CPC ......... G02F 1/133602; G02F 1/133603; G02F 1/133606; G02F 2001/133607; G02F 2201/30; G02F 2201/302; G02F 2201/305; G02B 5/1814; G02B 5/1819; G02B 6/0035; G02B 6/005
See application file for complete search history.

(56) References Cited

U.S. PATENT DOCUMENTS

2017/0363794 A1* 12/2017 Wan .................. H04N 13/32

* cited by examiner

*Primary Examiner* — Nathanael R Briggs
(74) *Attorney, Agent, or Firm* — Arent Fox LLP; Michael Fainberg

(57) ABSTRACT

A backlight module and a display device are provided. The backlight module includes: a light source, and a plurality of light exit apertures on a light exit side of the light source, where a converging grating is arranged in the light exit aperture; and the converging grating includes: a circular first grating section at the center, and a plurality of annular second grating sections surrounding the first grating section and radially outwardly distributed successively, where the light-transmitting slits of the first grating and the second grating sections are annular light-transmitting slits. The converging grating is configured to converge light at various angles emitted by the corresponding light exit aperture into some specified position.

11 Claims, 4 Drawing Sheets

BACKLIGHT MODULE AND DISPLAY DEVICE

CROSS-REFERENCES TO RELATED APPLICATION

This application claims priority to Chinese patent application No. 201810929386.2 filed on Aug. 15, 2018, which is incorporated herein by reference in its entirety.

FIELD

The present disclosure relates to the field of display technologies, and particularly to a backlight module and a display device.

BACKGROUND

There is a grayscale display technology based upon a Liquid Crystal (LC) lens in the new Liquid Crystal Display (LCD) technologies, and different electric signals can be applied to the liquid crystal layer for display at various grayscales.

SUMMARY

In one aspect, an embodiment of the disclosure provides a backlight module. The backlight module includes: a light source, and a plurality of light exit apertures on a light exit side of the light source, wherein a converging grating is arranged in at least one of the light exit apertures; the converging grating includes: a circular first grating section at a center, and a plurality of annular second grating sections surrounding the first grating section and radially outwardly distributed successively; light-transmitting slits of the first grating section and the second grating sections are annular light-transmitting slits; and the converging grating is configured to converge light emitted by the corresponding light exit aperture into a specified position.

In a possible implementation, in the backlight module above according to the embodiment of the disclosure, the light source includes a plurality of point light sources, and the display module further includes an optical sheet on a light exit side of the point light sources; and the plurality of light exit apertures are light exit apertures, arranged on the optical sheet, one-to-one corresponding to the point light sources.

In a possible implementation, in the backlight module above according to the embodiment of the disclosure, a grating periodicity of the first grating section is fixed, a grating periodicity of each second grating section is fixed, and grating periodicities of the second grating sections are different; and the grating periodicity of the first grating section is larger than the grating periodicity of any one of the second grating sections, and the grating periodicities of the second grating sections decreases as the distances between the second grating sections and the first grating section increase.

In a possible implementation, in the backlight module above according to the embodiment of the disclosure, the grating periodicity of the first grating section gradually decreases from the center to an edge along a radical direction of the circle; and the grating periodicity of each second grating section decreases as a distance thereof from the first grating section increases.

In a possible implementation, in the backlight module above according to the embodiment of the disclosure, the backlight module further includes a light-guiding plate, and the light source is located at a side of the light-guiding plate; and the plurality of light exit apertures are a plurality of light exit apertures at a light exit face of the light-guiding plate.

In a possible implementation, in the backlight module above according to the embodiment of the disclosure, the grating periodicity of the first grating section decreases as the distance thereof from the light source increases; and the grating periodicity of each second grating section decreases as the distance thereof from the light source increases.

In another aspect, an embodiment of the disclosure provides a display device including the backlight module according to any one of the technical solutions, and a display panel on a light exit side of the backlight module, wherein the display panel includes a plurality of pixel elements one-to-one corresponding to the light exit apertures of the backlight module; and at least one of the pixel elements includes: a first common electrode layer, a first electrode layer on a side of the first common electrode layer away from the backlight module, a second electrode layer on a side of the first electrode layer away from the first common electrode layer, a liquid crystal layer between the first electrode layer and the second electrode layer, a second common electrode layer on a side of the second electrode layer away from the liquid crystal layer, a color filter layer on a side of the second common electrode layer away from the second electrode layer, and a substrate on a side of the color filter layer away from the second common electrode layer, wherein the color filter layer includes a light-shielding area at a center, and a light-transmitting area surrounding the light-shielding area; the converging grating is configured to converge the light emitted by the light exit aperture into the light-shielding area of the corresponding color filter layer; and electric signals are applied to the first common electrode layer, the first electrode layer, the second electrode layer, and the second common electrode layer, so that the liquid crystal layer is equivalent to a micro-lens structure to enable light passing the converging grating to be incident on the light-transmitting area of the conesponding color filter layer.

In a possible implementation, in the display device above according to the embodiment of the disclosure, the first electrode layer includes a plurality of strip-shaped first transparent electrodes arranged in parallel, and the second electrode layer includes a plurality of strip-shaped second transparent electrodes arranged in parallel; an extension direction of the first transparent electrodes is perpendicular to an extension direction of the second transparent electrodes; the pixel element further includes: a first alignment layer between the first electrode layer and the liquid crystal layer, and a second alignment layer located between the second electrode layer and the liquid crystal layer; and the groove extension direction of the first alignment layer is perpendicular to the extension direction of the first transparent electrodes; and the groove extension direction of the second alignment layer is perpendicular to the extension direction of the second transparent electrodes.

In a possible implementation, in the display device above according to the embodiment of the disclosure, a thickness of the liquid crystal layer is larger than a spacing between two adjacent first transparent electrodes, and the thickness of the liquid crystal layer is larger than the spacing between two adjacent second transparent electrodes.

In a possible implementation, in the display device above according to the embodiment of the disclosure, the pixel element further includes: a protection layer between the backlight module and the first common electrode layer.

In a possible implementation, in the display device above according to the embodiment of the disclosure, the pixel element further includes: a planarization layer between the second common electrode layer and the color filter layer.

DETAILED DESCRIPTION

Figure 1:
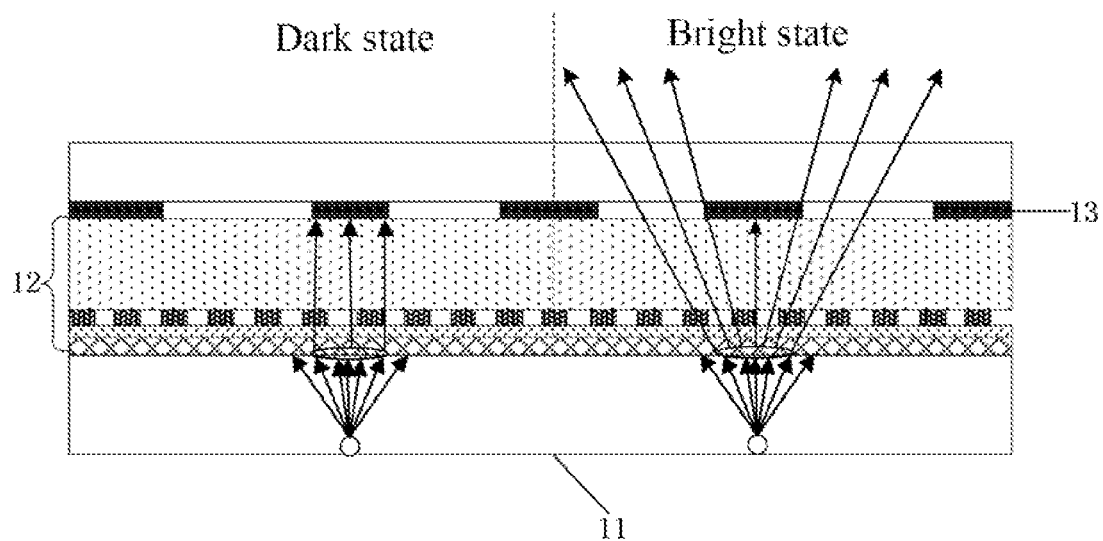
FIG. 1 is a schematic structural diagram of the display device in related art.

FIG. 1 illustrates a general structure of a display device in the grayscale display technology. The display device includes a backlight module 11, a liquid crystal cell 12 located on the light exit side of the backlight module, and a color filter layer 13 located on the upper side of the liquid crystal cell. Light emitted by the backlight module 11 is incident on the color filter layer 13 after passing the liquid crystal cell 12. When no electric signal is applied to the liquid crystal cell 12, the light emitted by the backlight module is incident on a light-shielding area of the color filter layer after passing the liquid crystal cell, and completely absorbed by the light-shielding material, thus resulting in a dark state; and when an electric signal is applied to the liquid crystal cell, the liquid crystal layer can be driven to form a liquid crystal lens so that the direction of the light which would otherwise have been incident on the light-shielding area is changed, and thus the light is incident on another area than the light-shielding area, thus resulting in a bright state. Different electric signals can be applied to the liquid crystal layer for display at a number of grayscales.

The size of a light exit aperture in the backlight module 11 is limited by the size of the corresponding light-shielding area thereof, and when the size of the light-shielding area is set too large, then the aperture ratio of the display device may be affected, so the optical efficiency of the display device is limited by the size of the light-shielding area. Accordingly it is desirable to improve the utilization ratio of light energy in the display device.

The embodiments of the disclosure provide a backlight module and a display device so as to improve the utilization ratio of light energy.

In order to make the objects, technical solutions, and advantages of the disclosure more apparent, the disclosure will be described below in further details with reference to the drawings. Apparently the embodiments to be described are only a part but not all of the embodiments of the disclosure. Based upon the embodiments here of the disclosure, all of other embodiments which can occur to those ordinarily skilled in the art without any inventive effort shall come into the scope of the disclosure as claimed.

A backlight module and a display device according to embodiments of the disclosure will be described below in details with reference to the drawings.

Figure 2:
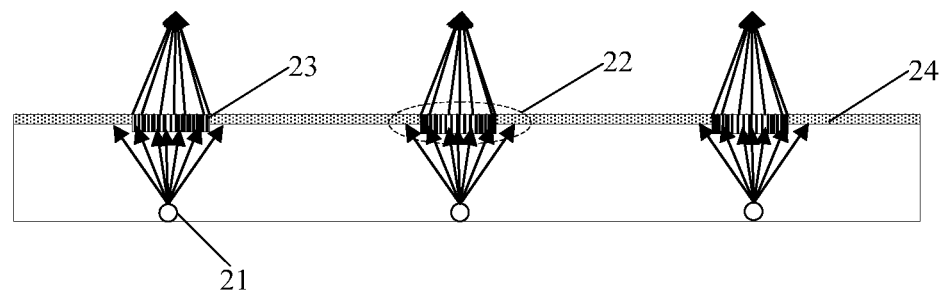
FIG. 2 is a first schematic structural diagram of a backlight module according to an embodiment of the disclosure in a sectional view.

As illustrated in FIG. 2, a backlight module according to an embodiment of the disclosure includes: a light source 21, and a plurality of light exit apertures 22 on the light exit side of the light source, where a converging grating 23 is arranged in the light exit aperture 22.

Figure 3:
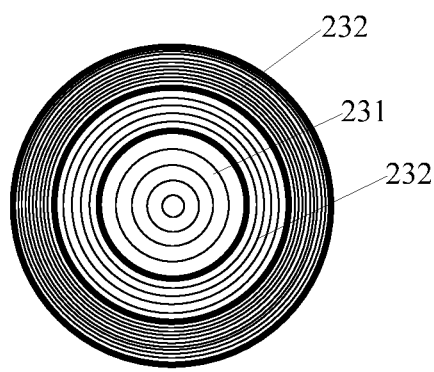
FIG. 3 is a first schematic structural diagram of a converging grating according to an embodiment of the disclosure in a top view.

Specifically as illustrated in FIG. 3, the converging grating 23 includes: a circular first grating section 231 located at the center, and a plurality of annular second grating sections 232 surrounding the first grating section 231 and radially outwardly distributed successively, where the light-transmitting slits of the first grating 231 and the light-transmitting slits of the second grating sections 232 are annular light-transmitting slits. In a specific implementation, the converging grating 23 is configured to converge light emitted by corresponding light exit aperture 22 into a specified position.

The backlight module above according to the embodiment of the disclosure is applicable to a directive liquid crystal display device. The converging grating is arranged in each light exit aperture of the backlight module, and the converging grating includes the circular first grating section located at the center, and the plurality of annular second grating sections surrounding the first grating section. The light-transmitting slits of the first grating and the second grating sections are annular light-transmitting slits. The respective converging gratings can converge light emitted by their corresponding light exit apertures 22 at respective angles into some specified position. When no electric signal is applied to a liquid crystal cell, light emitted from the light exit aperture 22 is converged into the area where a light-shielding layer of the display panel is located, thus resulting in a dark state of the display device; and when an electric signal is applied to the liquid crystal cell, liquid crystal molecules at the liquid crystal layer are inverted by an electric field so that the liquid crystal layer is equivalent to a micro-lens structure, so the light which originally would been converged into the light-shielding layer can be emitted to a light-transmitting area, thus resulting in a bright state of the display device. By applying different electric signals, the light originally concentrated into the light-shielding area can be emitted to the light-transmitting area to different degrees, thus resulting in different grayscale display. Since the converging gratings 23 can converge the light emitted from the light exit apertures, the sizes of the light exit apertures can be increased without increasing the area of the light-shielding layer, so that more light can be emitted from the backlight module to thereby improve in effect the utilization ratio of light energy so as to improve the display brightness.

In a possible implementation, as illustrated in FIG. 2, in the backlight module above according to the embodiment of the disclosure, the light source 21 can include a plurality of point light sources, and the display module further include an optical sheet 24 located on the light exit sides of the point light sources, where the plurality of light exit apertures 22 are light exit apertures, arranged on the optical sheet 24, one-to-one corresponding to the point light sources.

The light of the point light source emits radially in a centrally symmetric manner, and the light at the center position is perpendicularly incident on the converging grating 23 and then exits perpendicularly outward. As the incidence angles of the light incident on the converging grating 23 is decrementing, when all light is converged onto the positions where the perpendicularly incident light exit, then an appropriate grating periodicity needs to be set for the light at each incidence angle so that they can exit outward at a specific diffraction angle.

In a specific implementation, one first grating section 231 and a plurality of second grating sections 232 can be arranged, where the first grating section 231 is arranged for light at an incidence angle of 90 degrees, and the second grating sections 232 are arranged for light at respective incidence angles ranging from an incidence angle of light, from the light source incident on the edge of the outmost second grating section, to 90 degrees, where the angle of each degree in this range can correspond to one of the second grating sections. For example, when the smallest incidence angle of the light incident on the second grating sections is 45 degrees, then one second grating section is provided for each degree of 45 degrees to 89 degrees, so that the light at each incidence angle can be converged to the same preset position after being incident on the converging grating.

In some embodiments, the arrangement of the converging grating is as illustrated in FIG. 3. The grating periodicity of the first grating section 231 is fixed; the grating periodicity of each second grating section 232 is fixed, and the grating periodicities of the second grating sections are different, the grating periodicity of the first grating section 231 is larger than the grating periodicity of any one of the second grating sections 232, and the grating periodicities of the respective second grating sections are decreasing as the distances between the respective second grating sections and the first grating section are increasing. The grating periodicity is set as a function of the angle by which the incident light is deflected by the grating, and when incident light is to be deflected by a grating by a larger angle and then exit, then it needs a smaller grating periodicity. In the embodiment of the disclosure, light from a point light source, incident on a converging grating tend to be centrally symmetric, and light incident on a farther edge of the converging grating is to be deflected by a larger angle, so when a second grating section is set for each incidence angle, then it needs a smaller grating periodicity of a second grating section at a farther edge, and a larger grating periodicity of a second grating section at a closer position to the center, where the grating periodicity of the first grating section positioned at the center is larger than the grating periodicity of any one of the second grating section.

Figure 4:
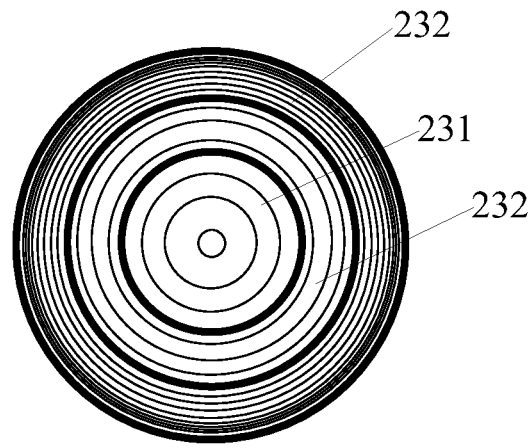
FIG. 4 is a second schematic structural diagram of the converging grating according to the embodiment of the disclosure in a top view.

In some embodiments, the converging grating can be structured as in FIG. 4. The grating periodicities of the first grating section 231 and the second grating sections 232 can vary gradually so that the light at each of the incidence angles can be converged into a specified position. As illustrated in FIG. 4, the grating periodicity of the first grating section 231 gradually decreases from the center to the edge along the radical direction of the circle, and the grating periodicity of each second grating section 232 decreases as the distance thereof from the first grating section increases. The principle of the gradually varying gratings above in the embodiment of the disclosure is substantially the same as the principle of the converging grating above as illustrated in FIG. 3 except that: with the converging grating structure as illustrated in FIG. 3, each incidence angle of interest shall correspond to one of the second grating sections; and with the converging grating structure as illustrated in FIG. 4, a few second grating sections can be set for several incidence angle areas, and the grating periodicities can be varied respectively in the first grating section and in the second grating sections so that the light at the respective incidence angles can be converged into the same specified position. In a real application, either of the converging grating structures can be applied, although the embodiment of the disclosure will not be limited thereto.

Figure 5:
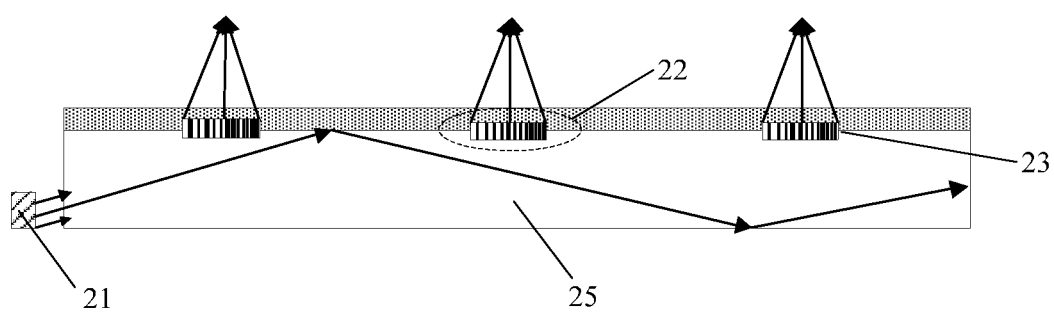
FIG. 5 is a second schematic structural diagram of the backlight module according to the embodiment of the disclosure in a sectional view.

In another implementation, as illustrated in FIG. 5, in the backlight module above according to the embodiment of the disclosure, the backlight module further includes a light-guiding plate 25 located on the light exit side of the light source 21, where the light source 21 is located on the side of the light-guiding plate 25, and the plurality of light exit apertures 22 are a plurality of light exit apertures arranged on the light exit face of the light-guiding plate 25.

Figure 6:
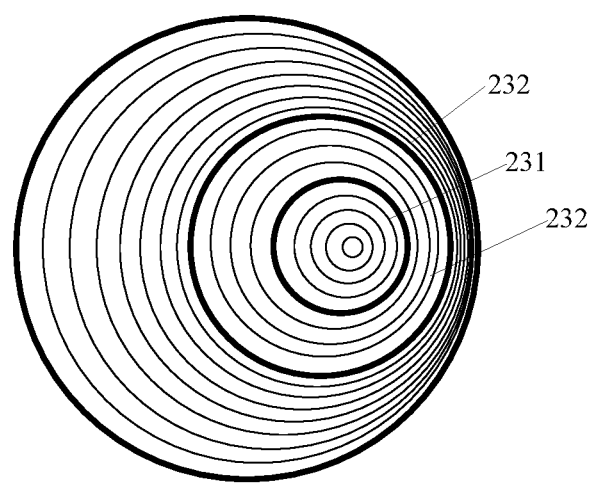
FIG. 6 is a third schematic structural diagram of the converging grating according to the embodiment of the disclosure in a top view.

The light emitted by the light source 21 are totally reflected at a preset angle in the light-guiding plate 25, and all incidence angles of the light incident on each light exit aperture are the total-reflection angle, so the converging grating in the light exit aperture is configured to emit the light outward at different diffraction angles, so that the light can be converged into the specified positions. As the distance of a converging grating from the light source is shorter, the converging grating needs to deflect incident light by a smaller angle, that is, there shall be a smaller diffraction angle; and as the distance of the converging grating from the light source is longer, the converging grating needs to deflect the incident light by a larger angle, that is, there shall be a larger diffraction angle. Accordingly in a specific implementation, in the converging grating above according to the embodiment of the disclosure, the grating periodicity of the first grating section 231 decreases as the distance thereof from the light source increases, and the grating periodicity of each second grating section 232 decreases as the distance thereof from the light source increases. As illustrated in FIG. 5, for example, when the light source 21 is located on the left to the light-guiding plate 25, then the point light source is located on the left to the each converging grating; and FIG. 6 illustrates a schematic structural diagram of a converging grating in a top view, where the grating periodicity of each of the first grating section 231 and the second grating sections 232 decreases from the left to the right in the horizontal direction. In this way, all the light incident on the converging grating can be converged into a specified position (a corresponding light-shielding layer BM).

Figure 7:
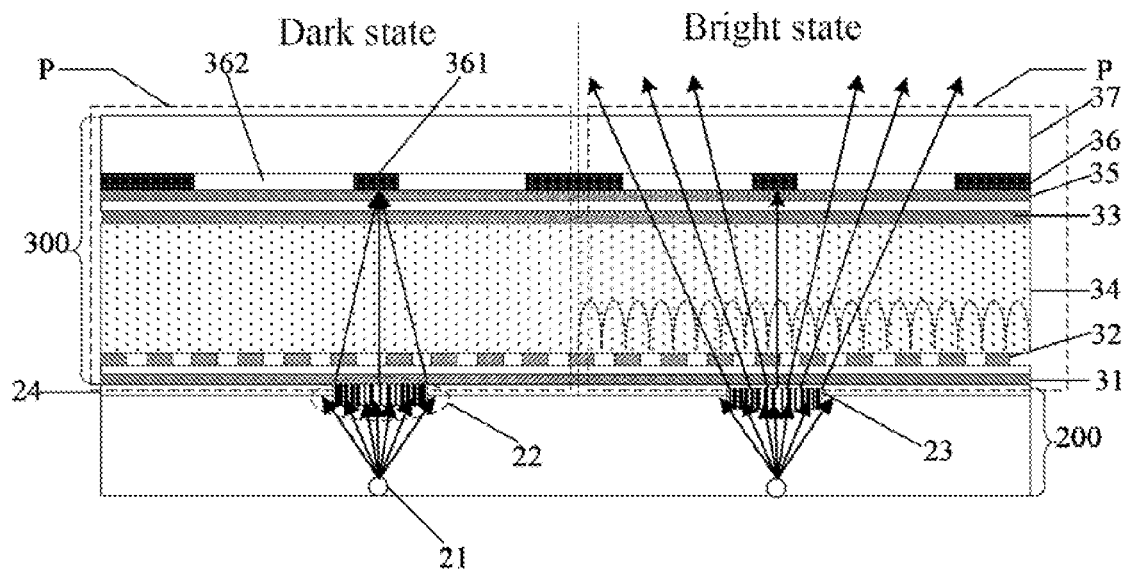
FIG. 7 is a first schematic structural diagram of a display device according to an embodiment of the disclosure in a sectional view.

Based upon the same idea, an embodiment of the disclosure provides a display device, and as illustrated in FIG. 7, the display device includes the backlight module according to any one of the implementations above, and a display panel 300 located on the light exit side of the backlight module 200. The display device can be a liquid crystal panel, a liquid crystal display, a liquid crystal TV set, a phone, a tablet computer, an electronic album, or another display device.

Specifically as illustrated in FIG. 7, the display panel 300 includes a plurality of pixel elements P one-to-one corresponding to the plurality of light exit apertures 22 of the backlight module 200.

Each pixel element P includes: a first common electrode layer 31, a first electrode layer 32 located on the side of the first common electrode layer 31 away from the backlight module 200, a second electrode layer 33 located on the side of the first electrode layer 32 away from the first common electrode layer 31, a liquid crystal layer 34 located between the first electrode layer 32 and the second electrode layer 33, a second common electrode layer 35 located on the side of the second electrode layer 33 away from the liquid crystal layer 34, a color filter layer 36 located on the side of the second common electrode layer 35 away from the second electrode layer 33, and a substrate 37 located on the side of the color filter layer 36 away from the second common electrode layer 35.

The color filter layer 36 includes a light-shielding area 361 located at the center, and a light-transmitting area 362 surrounding the light-shielding area 361; the converging grating 23 is configured to converge the light emitted by the light exit aperture into the light-shielding area of the corresponding color filter layer 36; and an electric signal is applied to the first common electrode layer 31, the first electrode layer 32, the second electrode layer 33, and the second common electrode layer 35, so that the liquid crystal layer 34 is equivalent to a micro-lens structure, to enable the light passing the converging grating 25 to be incident on the light-transmitting area 362 of the corresponding color filter layer 35.

In a specific implementation, when no electric signal is applied to the liquid crystal layer 34, the converging grating 23 converges the light emitted by the light exit aperture 22 into the light-shielding area 361 of the corresponding pixel element, thus resulting in a dark state of the display device; and when an electric signal is applied to the first common electrode layer 31, the first electrode layer 32, the second electrode layer 33, and the second common electrode layer 35, an electric field created respectively between the first electrode layer, and the first common electrode layer, the second electrode layer and the second common electrode layer is applied to the liquid crystal layer 34 so that liquid crystal molecules at the liquid crystal layer 34 are deflected differently by the electric field, and the liquid crystal layer is equivalent to a micro-lens structure so that the light originally would be incident on the light-shielding area 361 is incident on the light-transmitting area 362 under the action of the micro-lens, thus resulting in a bright stage of the display device. Different electric signals can be applied to the first electrode layer 32 and the second electrode layer 33, thus resulting in display at different grayscales.

Since each light exit aperture of the backlight module is provided with a converging grating, the converging grating includes a circular first grating section located at the center, and a plurality of annular second grating sections surrounding the first grating section. All the light-transmitting slits of the first grating and the second grating sections are annular light-transmitting slits configured to converge light emitted by the corresponding light exit aperture at respective angles into some specified position. In this way, the size of the light exit aperture can be increased without increasing the area of the light-shielding layer, so that more light can be emitted from the backlight module to thereby improve in effect the utilization ratio of light energy so as to improve the display brightness.

Figure 8:
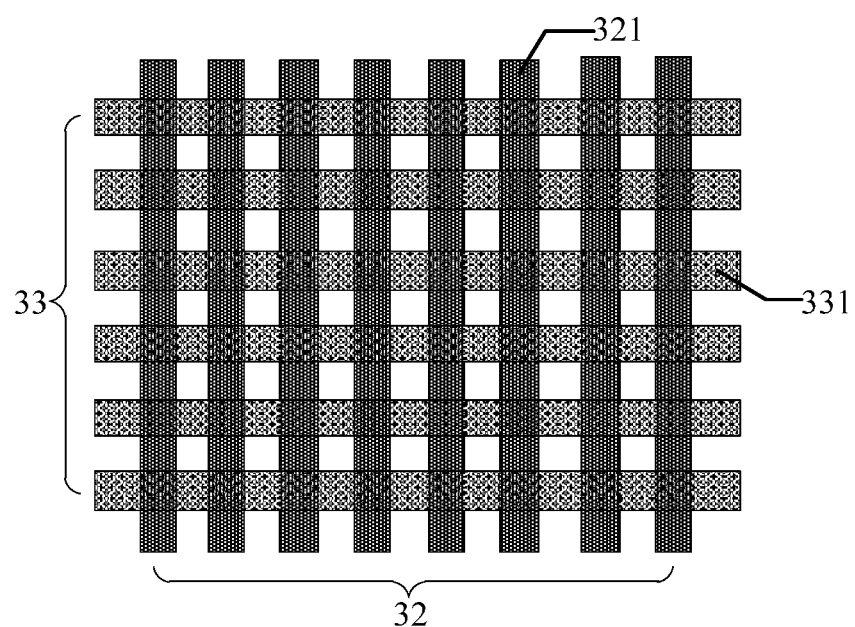
FIG. 8 is a schematic structural diagram of a first electrode layer and a second electrode layer according to an embodiment of the disclosure in a top view.

In a specific implementation, FIG. 8 illustrates a schematic structural diagram of the first electrode layer 32 and the second electrode layer 33 in a top view, where the first electrode layer 32 includes a plurality of strip-shaped first transparent electrodes 321 arranged in parallel, and the second electrode layer 33 includes a plurality of strip-shaped second transparent electrodes 331 arranged in parallel, where the extension direction of the first transparent electrodes 321 is perpendicular to the extension direction of the second transparent electrodes 331.

Figure 9:
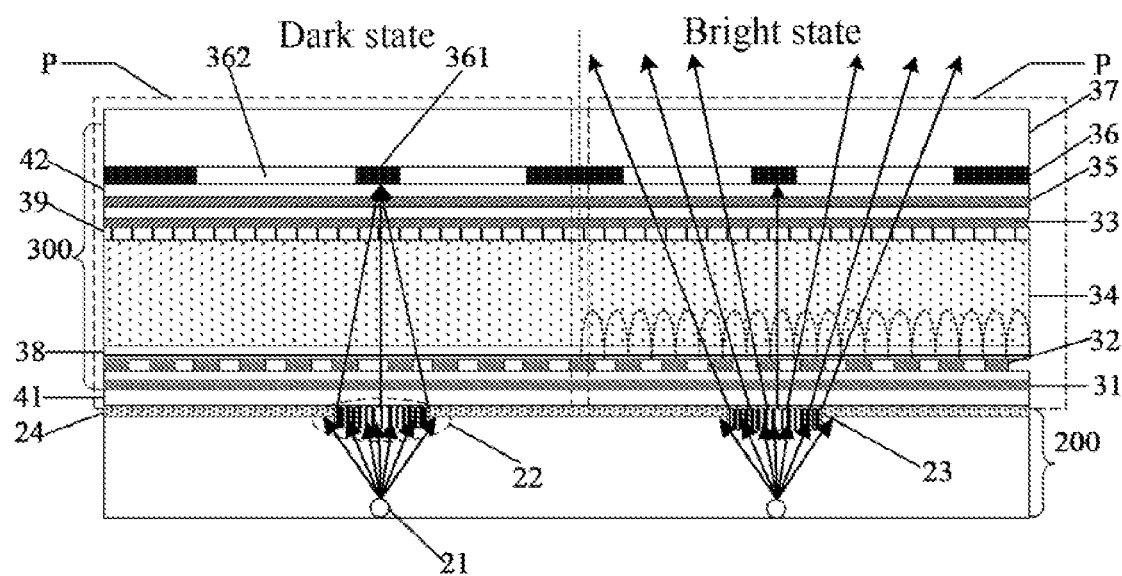
FIG. 9 is a second schematic structural diagram of the display device according to the embodiment of the disclosure in a sectional view.

As illustrated in FIG. 9, the pixel element P further includes: a first alignment layer 38 located between the first electrode layer 32 and the liquid crystal layer 34, and a second alignment layer 39 located between the second electrode layer 33 and the liquid crystal layer 34, where the groove extension direction of the first alignment layer 38 is perpendicular to the extension direction of the first transparent electrode 321, and the groove extension direction of the second alignment layer 39 is perpendicular to the extension direction of the second transparent electrodes 331.

In the embodiment of the disclosure, the liquid crystal layer has a large thickness, and in a real application, the electric signals can be applied to the respective first transparent electrodes 321 in the first electrode layer 32 and the first common electrode layer 31, to thereby form a first transverse electric field (in the direction as denoted by the dotted line in FIG. 9), and the electric signals can be applied to the respective second transparent electrodes 331 in the second electrode layer 33 and the second common electrode layer 35, to thereby form a second transverse electric field (not illustrated), where the directions of these two transverse electric fields are perpendicular to each other. Since the groove extension directions of the alignment layers on the two sides of the liquid crystal layer 34 are perpendicular to each other, the liquid crystal molecules can be divided by the first transverse electric field and the second transverse electric field into two layers of liquid crystals controlled respectively by the two transverse electric fields, whereby both of the two layers of liquid crystals can act on light in two polarization directions perpendicular to each other, so all light emitted from the converging grating can be dispersed by the liquid crystal layer to the light-transmitting area in a display period, thus further improving the utilization ratio of light energy, and the display brightness.

In order to avoid the transverse electric fields in the directions perpendicular to each other from interfering with the liquid crystals on the other side, the thickness of the liquid crystal layer 34 can be set far larger than the spacing between two adjacent first transparent electrodes 321, and the thickness of the liquid crystal layer 34 can be set far larger than the spacing between two adjacent second transparent electrodes 331. In a real application, when a large difference in voltage of a formed longitudinal electric field, the liquid crystal molecules at the middle of the liquid crystal layer are completely deflected to parallel to the direction of the longitudinal electric field, so the liquid crystal molecules on upper side of the middle the liquid crystal layer can be completely controlled by the upper transverse electric field, and the liquid crystal molecules on the lower side of the middle liquid crystal layer can be completely controlled by the lower transverse electric field, thus avoiding mutual interference between the two transverse electric fields.

In a real application, as illustrated in FIG. 9, the pixel element P further includes: a protection layer 41 located between the backlight module 200 and the first common electrode layer 31, and a planarization layer 42 located between the second common electrode layer 35 and the color filter layer 36. The protection layer 41 is configured to protect the converging grating of the backlight module, and can be made of a transparent insulation material, and the planarization layer 42 can be made of an organic resin material, and can planarize the surface of the second common electrode layer 35 to thereby make it easier to form the color filter layer 36.

In the backlight module and the display device according to the embodiments of the disclosure, the backlight module includes: a light source, and a plurality of light exit apertures arranged on the light exit side of the light source, where a converging grating is arranged in the light exit aperture; and the converging grating includes: a circular first grating section at the center, and a plurality of annular second grating sections surrounding the first grating section and radially outwardly distributed successively, where the light-transmitting slits of the first grating and the second grating sections are annular light-transmitting slits. In a specific implementation, the converging grating is configured to converge light emitted by the corresponding light exit aperture into a specified position. The converging grating is arranged in the light exit aperture of the backlight module, and the converging grating includes the circular first grating section at the center, and the plurality of annular second grating sections surrounding the first grating section. The light-transmitting slits of the first grating and the second grating sections are annular light-transmitting slits configured to converge light at various angles emitted by their corresponding light exit apertures into some specified position. In this way, the size of the light exit aperture can be increased without increasing the area of the light-shielding layer, so that more light can be emitted from the backlight module to thereby improve in effect the utilization ratio of light energy so as to improve the display brightness.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A backlight module, comprising: a light source, and a plurality of light exit apertures on a light exit side of the light source, wherein a converging grating is arranged in at least one of the light exit apertures;
   the converging grating comprises: a circular first grating section at a center, and a plurality of annular second grating sections surrounding the first grating section and radially outwardly distributed successively;
   light-transmitting slits of the first grating section and the second grating sections are annular light-transmitting slits; and
   the converging grating is configured to converge light emitted by the corresponding light exit aperture into a specified position.

2. The backlight module according to claim 1, wherein the light source comprises a plurality of point light sources, and the display module further comprise an optical sheet on a light exit side of the point light sources; and
   the plurality of light exit apertures are light exit apertures, arranged on the optical sheet, one-to-one corresponding to the point light sources.

3. The backlight module according to claim 2, wherein a grating periodicity of the first grating section is fixed, a grating periodicity of each of the second grating sections is fixed, and grating periodicities of the second grating sections are different; and
   the grating periodicity of the first grating section is larger than the grating periodicity of any one of the second grating sections, and the grating periodicities of the second grating sections decrease as the distances between the second grating sections and the first grating section increase.

4. The backlight module according to claim 2, wherein the grating periodicity of the first grating section gradually decreases from the center to an edge along a radical direction of the circle; and
   the grating periodicity of each second grating section decreases as a distance thereof from the first grating section increases.

5. The backlight module according to claim 1, further comprising a light-guiding plate, and the light source is located at a side of the light-guiding plate; and
   the plurality of light exit apertures are a plurality of light exit apertures at a light exit face of the light-guiding plate.

6. The backlight module according to claim 5, wherein the grating periodicity of the first grating section decreases as a distance thereof from the light source increases; and
   the grating periodicity of each second grating section decreases as a distance thereof from the light source increases.

7. A display device, comprising the backlight module according to claim 1, and a display panel on a light exit side of the backlight module, wherein:
   the display panel comprises a plurality of pixel elements one-to-one corresponding to the light exit apertures of the backlight module; and
   at least one of the pixel elements comprises: a first common electrode layer, a first electrode layer on a side of the first common electrode layer away from the backlight module, a second electrode layer on a side of the first electrode layer away from the first common electrode layer, a liquid crystal layer between the first electrode layer and the second electrode layer, a second common electrode layer on a side of the second electrode layer away from the liquid crystal layer, a color filter layer on a side of the second common electrode layer away from the second electrode layer, and a substrate on a side of the color filter layer away from the second common electrode layer;
   wherein the color filter layer comprises a light-shielding area located at a center, and a light-transmitting area surrounding the light-shielding area;
   the converging grating is configured to converge the light emitted by the light exit aperture into the light-shielding area of the corresponding color filter layer; and
   electric signals are applied to the first common electrode layer, the first electrode layer, the second electrode layer, and the second common electrode layer, so that the liquid crystal layer is equivalent to a micro-lens structure to enable light passing the converging grating to be incident on the light-transmitting area of the corresponding color filter layer.

8. The display device according to claim 7, wherein the first electrode layer comprises a plurality of strip-shaped first transparent electrodes arranged in parallel, and the second electrode layer comprises a plurality of strip-shaped second transparent electrodes arranged in parallel;
   an extension direction of the first transparent electrodes is perpendicular to an extension direction of the second transparent electrodes;
   at least one of the pixel elements further comprises: a first alignment layer between the first electrode layer and the liquid crystal layer, and a second alignment layer between the second electrode layer and the liquid crystal layer; and a groove extension direction of the first alignment layer is perpendicular to the extension direction of the first transparent electrodes; and a groove extension direction of the second alignment layer is perpendicular to the extension direction of the second transparent electrodes.

9. The display device according to claim 8, wherein a thickness of the liquid crystal layer is larger than a spacing between two adjacent first transparent electrodes, and the thickness of the liquid crystal layer is larger than a spacing between two adjacent second transparent electrodes.

10. The display device according to claim 7, wherein at least one of the pixel elements further comprises: a protection layer between the backlight module and the first common electrode layer.

11. The display device according to claim 7, wherein at least one of the pixel elements further comprises: a planarization layer between the second common electrode layer and the color filter layer.

* * * * *